United States Patent
Patwardhan

(10) Patent No.: US 7,441,838 B2
(45) Date of Patent: Oct. 28, 2008

(54) BACK SUPPORT MECHANISM FOR VEHICLE SEAT

(75) Inventor: Vikas Patwardhan, Lynwood, WA (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 11/677,686

(22) Filed: Feb. 22, 2007

(65) Prior Publication Data

US 2008/0203785 A1 Aug. 28, 2008

(51) Int. Cl.
*B60N 2/427* (2006.01)
*B60N 2/42* (2006.01)

(52) U.S. Cl. .............................. 297/216.13; 297/216.14

(58) Field of Classification Search ............ 297/216.13, 297/216.14
See application file for complete search history.

(56) References Cited

U.S. PATENT DOCUMENTS

| | | | | |
|---|---|---|---|---|
| 5,295,729 A * | 3/1994 | Viano | ..................... | 297/216.14 |
| 5,685,606 A | 11/1997 | Lance | | |
| 5,746,467 A * | 5/1998 | Jesadanont | .......... | 297/216.13 X |
| 5,927,804 A * | 7/1999 | Cuevas | ............... | 297/216.13 X |
| 6,019,424 A * | 2/2000 | Ruckert et al. | ...... | 297/216.13 X |
| 6,022,074 A * | 2/2000 | Swedenklef | ........... | 297/216.14 |
| 6,024,406 A | 2/2000 | Charras et al. | | |
| 6,050,637 A * | 4/2000 | Håland et al. | .......... | 297/216.14 |
| 6,062,642 A | 5/2000 | Sinnhuber et al. | | |
| 6,135,561 A * | 10/2000 | Kruger et al. | ....... | 297/216.13 X |
| 6,296,306 B1 * | 10/2001 | Specht et al. | .......... | 297/216.14 |
| 6,367,859 B1 * | 4/2002 | Flory et al. | ......... | 297/216.13 X |
| 6,499,803 B2 | 12/2002 | Nakane et al. | | |
| 6,520,577 B2 | 2/2003 | Kitagawa | | |
| 6,585,324 B2 * | 7/2003 | Eppert et al. | ........ | 297/216.13 X |
| 6,644,740 B2 | 11/2003 | Holst et al. | | |
| 6,688,686 B1 | 2/2004 | McEvoy et al. | | |
| 6,719,368 B1 | 4/2004 | Neale | | |
| 6,767,064 B2 | 7/2004 | Veine et al. | | |
| 6,820,933 B2 | 11/2004 | Fereira Da Silva | | |
| 6,983,989 B1 | 1/2006 | Veine et al. | | |
| 6,994,399 B2 | 2/2006 | Van-Thournout et al. | | |
| 7,011,369 B2 | 3/2006 | Massara et al. | | |
| 7,044,544 B2 * | 5/2006 | Humer et al. | ....... | 297/216.13 X |
| 7,083,233 B2 | 8/2006 | Massara et al. | | |
| 2003/0085600 A1 | 5/2003 | Mori | | |
| 2006/0061170 A1 | 3/2006 | Massara et al. | | |

FOREIGN PATENT DOCUMENTS

JP 04353036 A * 12/1992 ............ 297/216.13

* cited by examiner

*Primary Examiner*—Rodney B. White
(74) *Attorney, Agent, or Firm*—Brooks Kushman P.C.

(57) ABSTRACT

A back support mechanism for a vehicle seat is provided with a track mounted to a seat back of the vehicle seat. A carriage is mounted to the track for linear translation along the track between a first position and an actuated position. A support member is connected to the carriage for supporting a back portion of an occupant of the vehicle seat. A biasing member cooperates with the carriage to urge the carriage to the first position. If the occupant back portion imparts a load to the support member exceeding a predetermined force, the support member and the carriage translate along the track over a range of translation. The range of translation is sized to accommodate a corresponding translation of a head of the occupant to a head restraint of the vehicle seat.

20 Claims, 3 Drawing Sheets

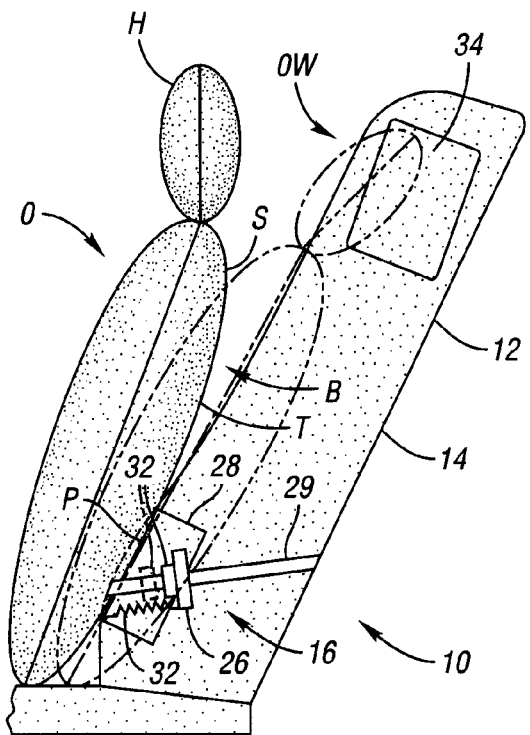
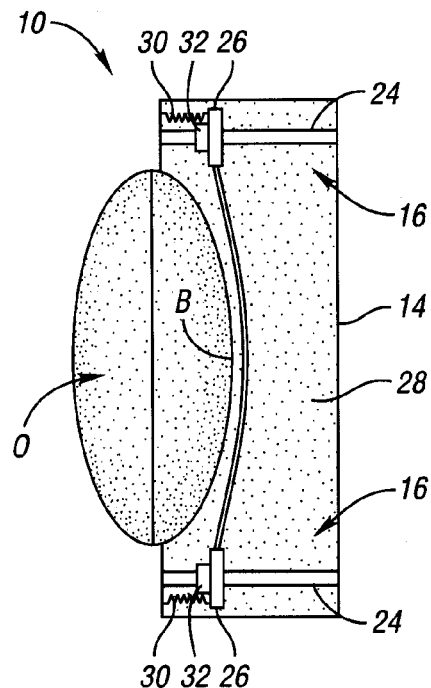
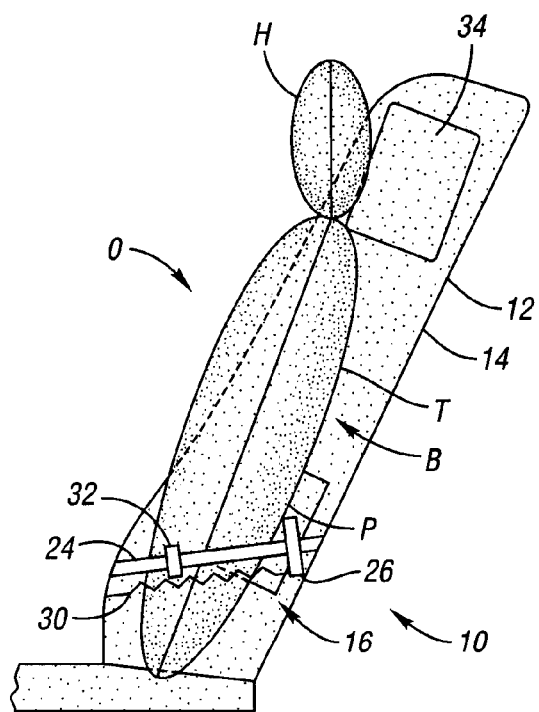
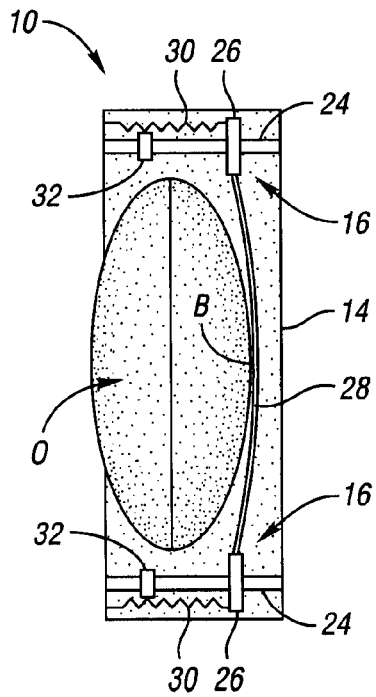

US 7,441,838 B2

BACK SUPPORT MECHANISM FOR VEHICLE SEAT

BACKGROUND OF THE INVENTION

1. Field of the Invention

The invention relates to back support mechanisms for vehicle seats.

2. Background Art

Vehicle seats have been provided with back support mechanisms to provide support for the back of an occupant. An example of a vehicle seat with a back support mechanism is disclosed in U.S. Pat. No. 6,644,740 to Holst et al., which issued on Nov. 11, 2003, and is incorporated in its entirety by reference herein.

Vehicle seats have also been provided with translatable head restraints for translating to an impact position in response to a force imparted to the seat by an occupant during an impact condition. One example of a vehicle seat having a translatable head restraint is disclosed in U.S. Pat. No. 6,767,064 to Veine et al., which issued on Jul. 27, 2004, and is incorporated in its entirety by reference herein.

BRIEF DESCRIPTION OF THE DRAWINGS

FIG. 1 is a side elevation view of a first embodiment of a vehicle seat illustrated with an occupant;

FIG. 2 is a top plan view of the vehicle seat and occupant of FIG. 1;

FIG. 3 is a side elevation view of the vehicle seat and occupant of FIG. 1 during an impact condition;

FIG. 4 is a top plan of the vehicle seat and occupant of FIG. 3;

DETAILED DESCRIPTION OF EMBODIMENTS OF THE INVENTION

Figure 5:
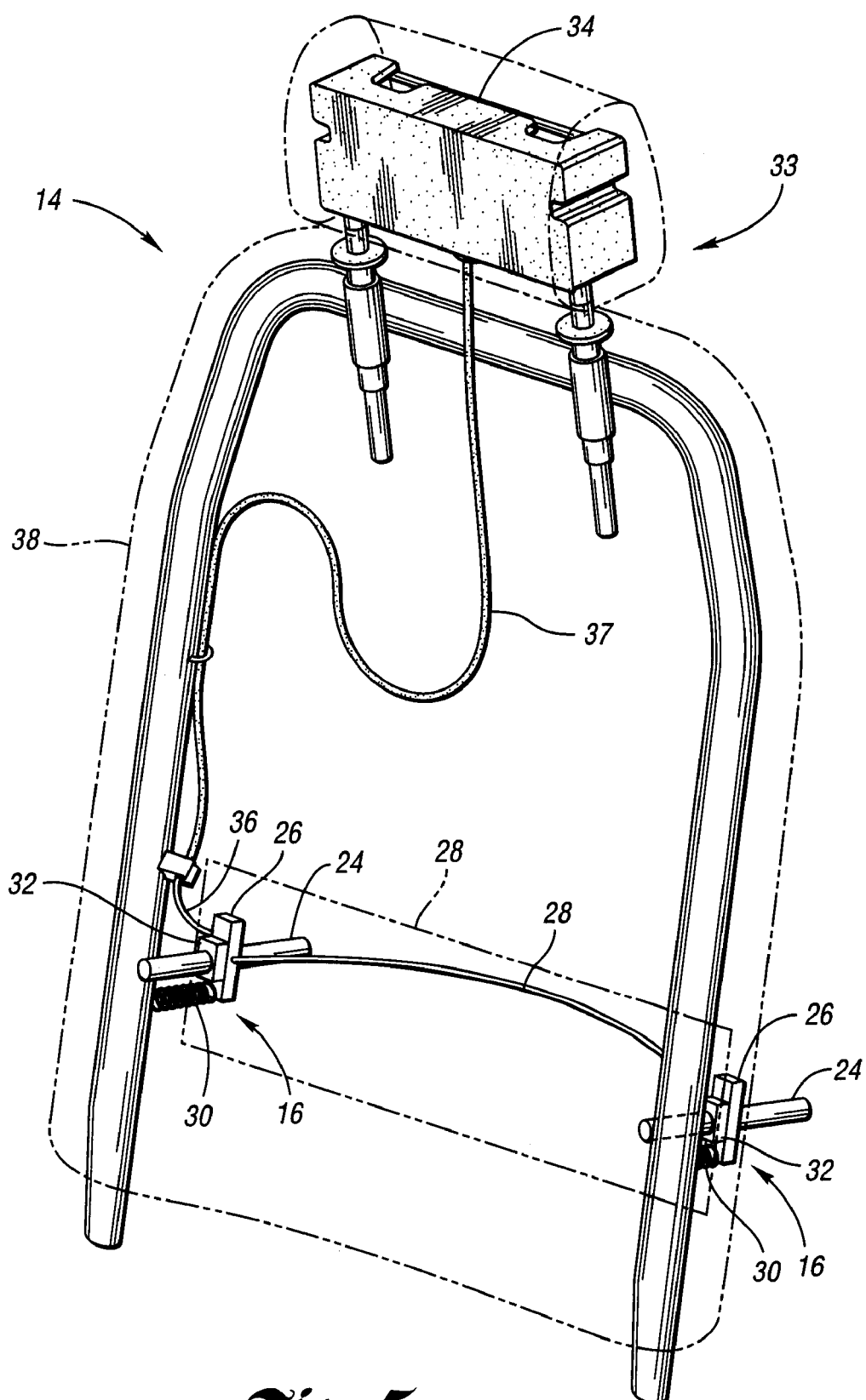
FIG. 5 is a perspective view of a second embodiment of a vehicle seat illustrating a seat frame with a back support mechanism and an active head restraint system.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention.

With reference now to FIG. 1, a vehicle seat is illustrated in accordance with the present invention and is referenced generally by numeral 10. The vehicle seat 10 includes a seat bottom 18 secured to a floor of the associated vehicle for seating an occupant upon the seat bottom 18. A seat back 12 extends from the seat bottom 18 and is secured relative to the seat bottom 18 for supporting the back of the occupant against the seat back 12. In another embodiment, the seat back 12 is secured to the floor of the associated vehicle. The seat back 12 may be adjustable relative to the seat bottom 18 to allow rotational movement of the seat back 12.

The seat 10 also includes a head restraint 34 extending above the seat back 12 for supporting the head of the occupant against the head restraint 34. In one embodiment, the head restraint 34 is connected to the seat frame 14. In another embodiment, the head restraint 34 is integral to the seat back 12. The head restraint 34 may move linearly relative to the seat back 12 as an active head restraint 34.

In one embodiment, the seat back 12 includes a frame 14 for providing the structural support for the seat back 12. Any type of cover, cushion or padding may be utilized to surround the seat frame 14.

A back support mechanism 16 is connected to the seat frame 14 of the seat back 12. The back support mechanism 16 is illustrated in a first position, commonly referred to as a design position. The design position of the back support mechanism 16 is the position where the back support mechanism 16 rests when not actuated.

The vehicle seat 10 may support an occupant O. During an impact condition, the vehicle seat 10 accelerates into the occupant O. Without the back support mechanism 16, the acceleration causes a certain amount of occupant displacement or intrusion into the seat back 12. The acceleration also causes the head H of the occupant O to travel a distance until impacting with the head restraint 34. An active head restraint 34 may be utilized to decrease this distance that the head H travels.

In prior art vehicle seats, the occupant intrusion into the seat back 12 is not generally equal to the distance that the head H must travel until impact with the head restraint 39. This occurrence may result in occupant whiplash as illustrated in phantom as OW caused by excessive rotation of the head relative to the occupant's back.

In one embodiment, the back support mechanism 16 supports a back portion B of the occupant O. The back portion B of the occupant O may be a pelvic region P, a torso region T, or a shoulder region S or a combination of two or all of these regions. When the back portion B of the occupant O imparts a load greater than a predetermined force during an impact condition, the back support mechanism 16 allows a specified amount of occupant intrusion into the seat back 12. The specified amount of occupant intrusion may be generally equal to a distance the head H of the occupant must travel to impact the head restraint 30. Excessive translation of the head H relative to the back B is prevented because the distance the back B and the head H of the occupant O are travel generally the same distance.

With reference to FIGS. 1 and 2, the back support mechanism 16 has a pair of travel rods 24 mounted on the seat frame 14. A pair of sliders 26 are each moveably mounted on the travel rods 24. Any suitable slider 26 and mounting on the travel rod 24 are contemplated within the scope of the present invention. The slider 26 may be provided with a ball bearing assembly, as illustrated, to reduce friction of the slider 26 along the travel rod 24. Any suitable type of bearing assembly may be used.

In one embodiment, a suspension wire 28 extends to each of the sliders 26. The suspension wire 28 may have padding and cushioning surrounding the suspension wire 28 to provide support to the occupant O. In another embodiment, the suspension wire 28 may be a lumbar support mechanism. Of course, any suitable support mechanism 28 is contemplated within the scope of the present invention.

A pair of extension springs 30 are each connected to one of the sliders 26 and the frame 14. The pair of extension springs 30 provide balanced loading on the sliders 26. In another embodiment, one extension spring 30 may connect with a slider 26 and the frame 14. In the embodiment as illustrated, each extension spring 30 urges the corresponding slider 26 to a first position as illustrated in the design position. A pair collar 32, serving as a hard stop on the travel rod 24 to limit the range of translation of the slider 26 in one embodiment. The collar 32 is illustrated mounted at various positions along the travel rod 24 thereby facilitating adjustability for one or more seat designs. In another embodiment, a second hard stop 32 may be provided on the travel rod 24 to limit the actuated position for the slider 26.

Referring now to FIGS. 3 and 4, the back support mechanism 16 is illustrated in an actuated position when an impact is imparted on the vehicle seat 10. During the impact, the seat back 12 may receive a force from the occupant O against the seat back 12. The force generated by the occupant O may be, for example, when the vehicle impacts another object thereby accelerating the vehicle seat 10 into the occupant O. Such an impact condition may be generated from an impact such as a rear impact. Likewise, the impact condition may be generated from a forward impact wherein the occupant O rebounds from a seat harness or other mechanism, into the seat 10. If the force of the occupant O exceeds a predetermined force to overcome the bias of the extension spring 50, then the back support mechanism 16 actuates.

The force from the occupant O causes the suspension wire 28 and sliders 26 to move along the travel rods 24 to the actuated position. The head H travels a distance to impact the head restraint 34. The back support mechanism 16 allows the back portion B of the occupant O to travel the same distance claimed by the head H must travel. Excessive translation of the head H relative to the back B is prevented because the distance that the back B and the head H of the occupant O travel generally the same distance.

After the load has been removed from the suspension wire 28, the extension springs 30 urge the sliders 26 and the suspension wire 28 to return to the first position as illustrated in FIG. 1. The extension springs 30 return the back support mechanism 16 to the first position as illustrated in FIG. 1, allowing the back support mechanism 16 to reset automatically.

Referring now to FIG. 5, a seat frame 14 is illustrated with a cover and cushion or padding removed for depicting internal components. In one embodiment, the suspension wire 28 may be a lumbar support to support a back portion of an occupant as illustrated in phantom as may be adjustable as known in the art.

An active head restraint system 33 may be provided on the seat frame 14. The active head restraint system 33 may have a Bowden cable 36 connected to the back support mechanism 16. Alternatively, the cable 36 extends through a sheath stand and actuates the head restraint 34 from the design position to an actuated position to orient the head restraint 34 closer to the head of an occupant O in order to reduce injury to the occupant. An example of an active head restraint 34 is disclosed in U.S. Pat. No. 6,767,064. Of course, any suitable active head restraint system 33 and head restraint 34 are contemplated within the scope of the present invention.

The active head restraint 34 accommodates a head of an occupant so that the head must travel a smaller distance to meet the head restraint 34. The use of the active head restraint 34 allows for a smaller range of movement of the slider 26 and suspension wire 28 to accommodate the back portion of an occupant of the vehicle seat 10.

Figure 6:
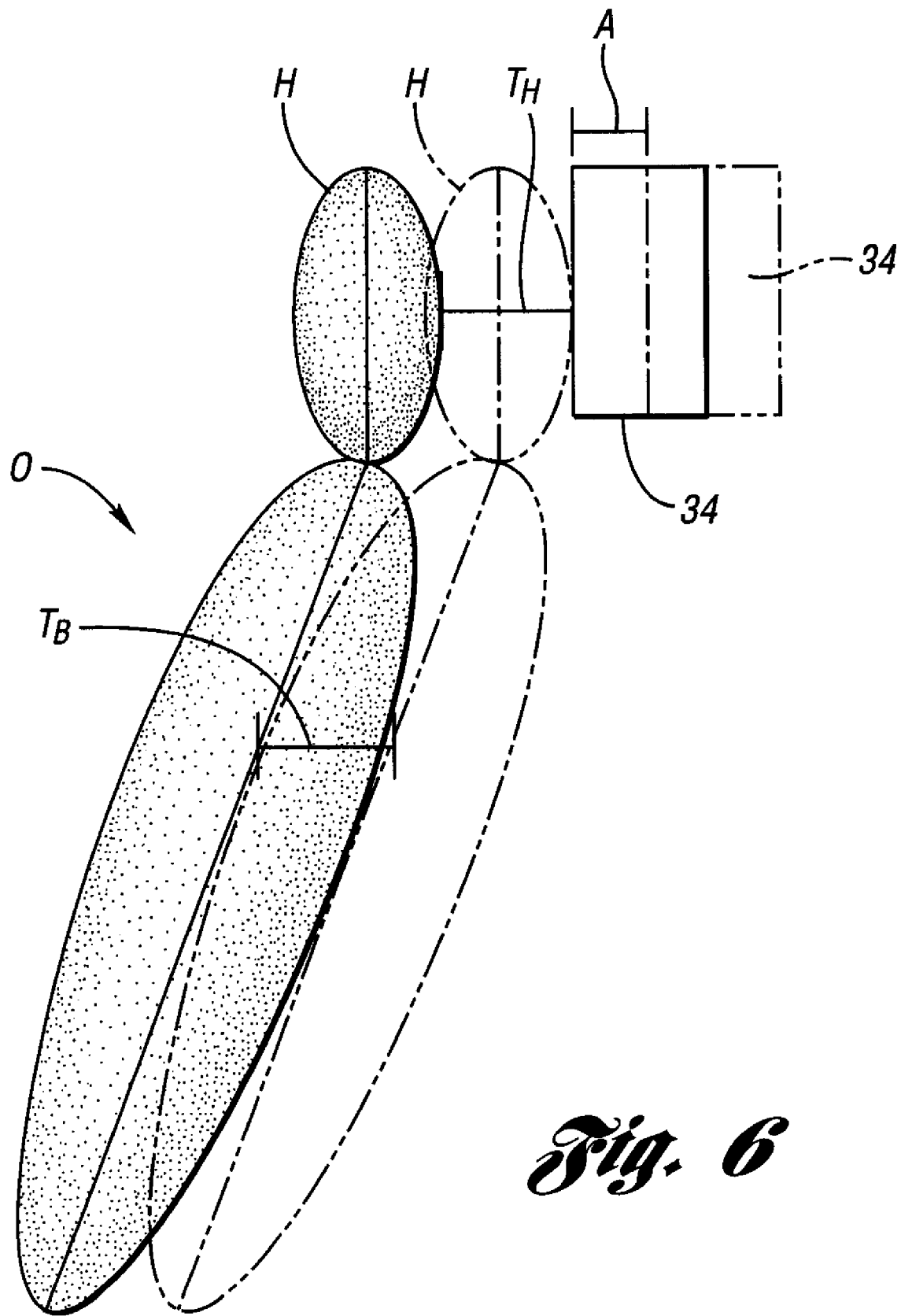
FIG. 6 is a schematic view of an occupant and a head restraint.

Referring to FIG. 6, the total distance between the occupant's head H and the head restraint 34 in the design position is lessened by a distance A of translation of the active head restraint. Thus, the head H travels a distance $T_H$ in the impact condition. Therefore, the distance of intrusion $T_B$, which is generally equivalent to the travel distance $T_H$ of the head H is reduced in comparison to a static head restraint system.

In summary, a vehicle seat 10 is provided with a back support mechanism 16 to support a back portion of an occupant for a distance of intrusion into the seat back generally equal to a distance the occupant's head travels to a head restraint 34.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A back support mechanism for a vehicle seat comprising:
    at least one longitudinal track adapted to be mounted within a seat back of a vehicle seat;
    at least one carriage mounted to the at least one track for linear translation along the at least one track between a first position and an actuated position;
    a support member connected to the carriage for supporting a back portion of an occupant; and
    at least one biasing member cooperating with the at least one carriage to urge the carriage to the first position;
    wherein if the occupant's back portion imparts a load to the support member during an impact condition that exceeds a predetermined force, the support member and the at least one carriage translate along the at least one track over a range of translation that is sized to accommodate a corresponding translation of a head of the occupant to a head restraint of the vehicle seat.

2. The back support mechanism of claim 1 wherein the range of translation is limited in one direction.

3. The back support mechanism of claim 2 wherein the range of translation is limited in one direction as at least one collar provided on the at least one track at the first position.

4. The back support mechanism of claim 2 wherein the range of translation is limited in one direction as at least one collar that is adapted to be mounted at various positions on the at least one longitudinal track.

5. The back support mechanism of claim 2 wherein the at least one carriage and the support member move from the first position to the actuated position and the biasing member urges the at least one carriage and the support member to return to the first position.

6. The back support mechanism of claim 1 wherein the at least one biasing member further comprises at least one extension spring.

7. The back support mechanism of claim 1 wherein the support member further comprises a lumbar support.

8. The back support mechanism of claim 1 wherein the at least one carriage has a bearing assembly to facilitate translation of the at least one carriage along the at least one track.

9. The back support mechanism of claim 1 wherein the at least one longitudinal track further comprises at least one travel rod.

10. The back support mechanism of claim 1 wherein the range of translation is limited by the biasing member.

11. The back support mechanism of claim 10 wherein the range of translation is limited in a direction of the actuated position by the biasing member.

12. The back support mechanism of claim 1 wherein the at least one longitudinal track further comprises a first longitudinal track and a second longitudinal track provided on opposing sides of the support member.

13. The back support mechanism of claim 12 wherein the at least one carriage further comprises a first carriage moveably mounted on the first longitudinal track and a second carriage moveably mounted on the second longitudinal track.

14. The back support mechanism of claim 12 wherein the support member further comprises a suspension wire provided between the first carriage and the second carriage.

15. A vehicle seat comprising:
    a seat back having a seat frame;
    at least one longitudinal track mounted to the seat frame,
    at least one carriage mounted to the at least one track for linear translation along the at least one track between a first position and an actuated position;
    a support member connected to the carriage for supporting a back portion of an occupant;
    at least one biasing member cooperating with to the at least one carriage to urge the carriage to the first position; and
    a head restraint mounted on an upper portion of the seat frame;
    wherein if the occupant's back portion imparts a load to the support member during an impact condition that exceeds a predetermined force, the support member and the at least one carriage translate along the at least one track over a range of translation that is sized to accommodate a corresponding translation of a head of the occupant to the head restraint.

16. The vehicle seat of claim 15 further comprising an active head restraint system for translating the head restraint a distance relative to the seat back toward the head of the occupant for minimizing intrusion of the occupant's back into the seat back.

17. The vehicle seat of claim 15 further comprising:
    a first longitudinal track and a second longitudinal track mounted on opposite sides of the seat frame; and
    a first carriage mounted for translation along the first track and a second carriage mounted for translation along the second longitudinal track;
    wherein the support member further comprises a suspension wire provided between the first carriage and the second carriage.

18. A vehicle seat comprising:
    a seat back having a seat frame;
    at least one longitudinal track mounted on the seat frame;
    at least one carriage mounted to the at least one track for linear translation along the at least one track between a first position and an actuated position;
    a support member connected to the carriage for supporting a back portion of an occupant;
    at least one biasing member cooperating with to the at least one carriage to urge the carriage to the first position;
    a head restraint provided on the seat frame; and
    an active head restraint system operatively connected to the head restraint and the back support mechanism translating the head restraint a specified distance relative to the seat back;
    wherein if the occupant back portion imparts a load to the support member that exceeds a predetermined force during an impact condition, the support member and the at least one carriage translate along the at least one track over a range of translation, the range of translation of the at least one carriage being generally equal to a corresponding translation of the head of the occupant to the head restraint after the active head restraint system has translated the head restraint the specified distance relative to the seat back.

19. The vehicle seat of claim 18 further comprising:
    a first longitudinal track and a second longitudinal track mounted on opposite sides of the seat frame; and
    a first carriage mounted to the first track and a second carriage mounted to the second longitudinal track;
    wherein the back support mechanism support member further comprises a suspension wire provided between the first carriage and the second carriage.

20. The vehicle seat of claim 18 wherein the back support mechanism support member further comprises a lumbar support.

* * * * *

UNITED STATES PATENT AND TRADEMARK OFFICE
CERTIFICATE OF CORRECTION

PATENT NO. : 7,441,838 B2 Page 1 of 1
APPLICATION NO. : 11/677686
DATED : October 28, 2008
INVENTOR(S) : Vikas Patwardhan It is certified that error appears in the above-identified patent and that said Letters Patent is hereby corrected as shown below:

Column 5, Line 14, Claim 15:

Delete "to" (first instance).

Column 6, Line 9, Claim 18:

Delete "to" (first instance).

Signed and Sealed this

Thirteenth Day of January, 2009

JON W. DUDAS
*Director of the United States Patent and Trademark Office*